Figure 4:
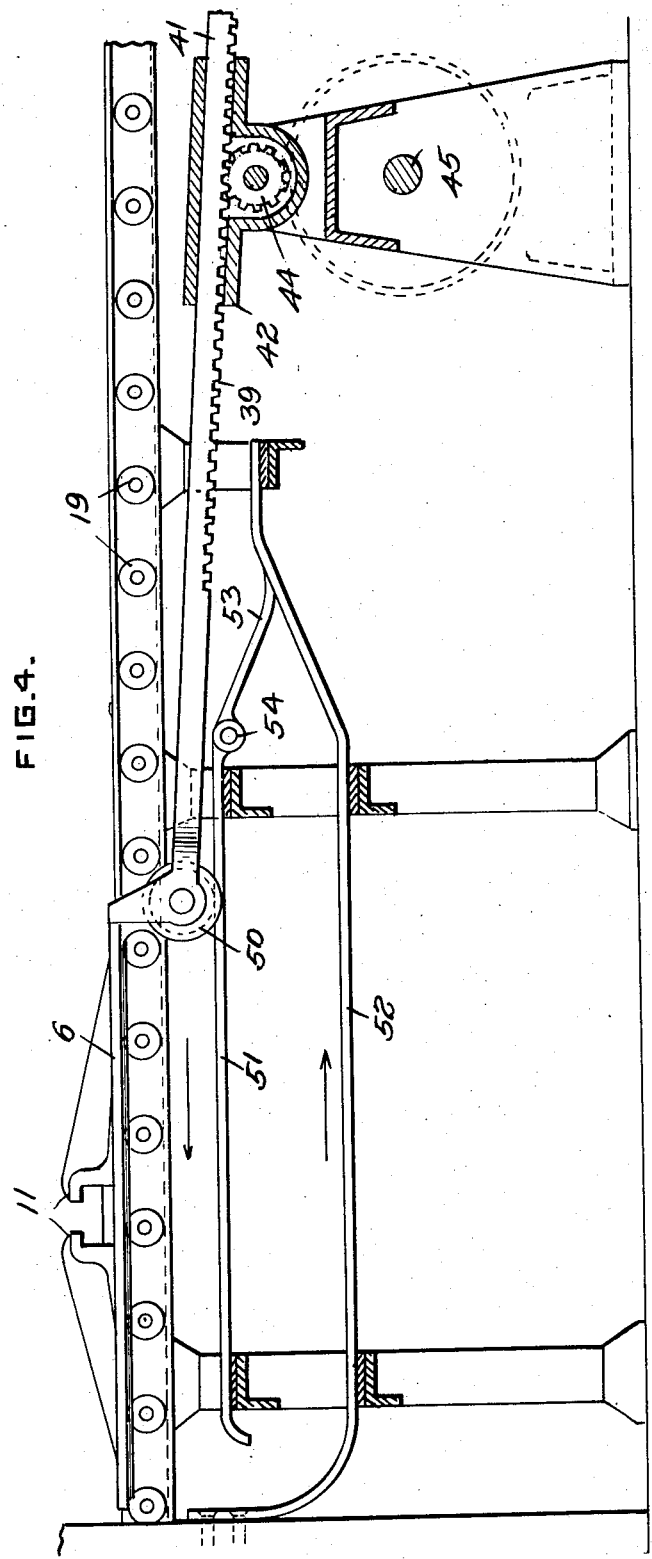

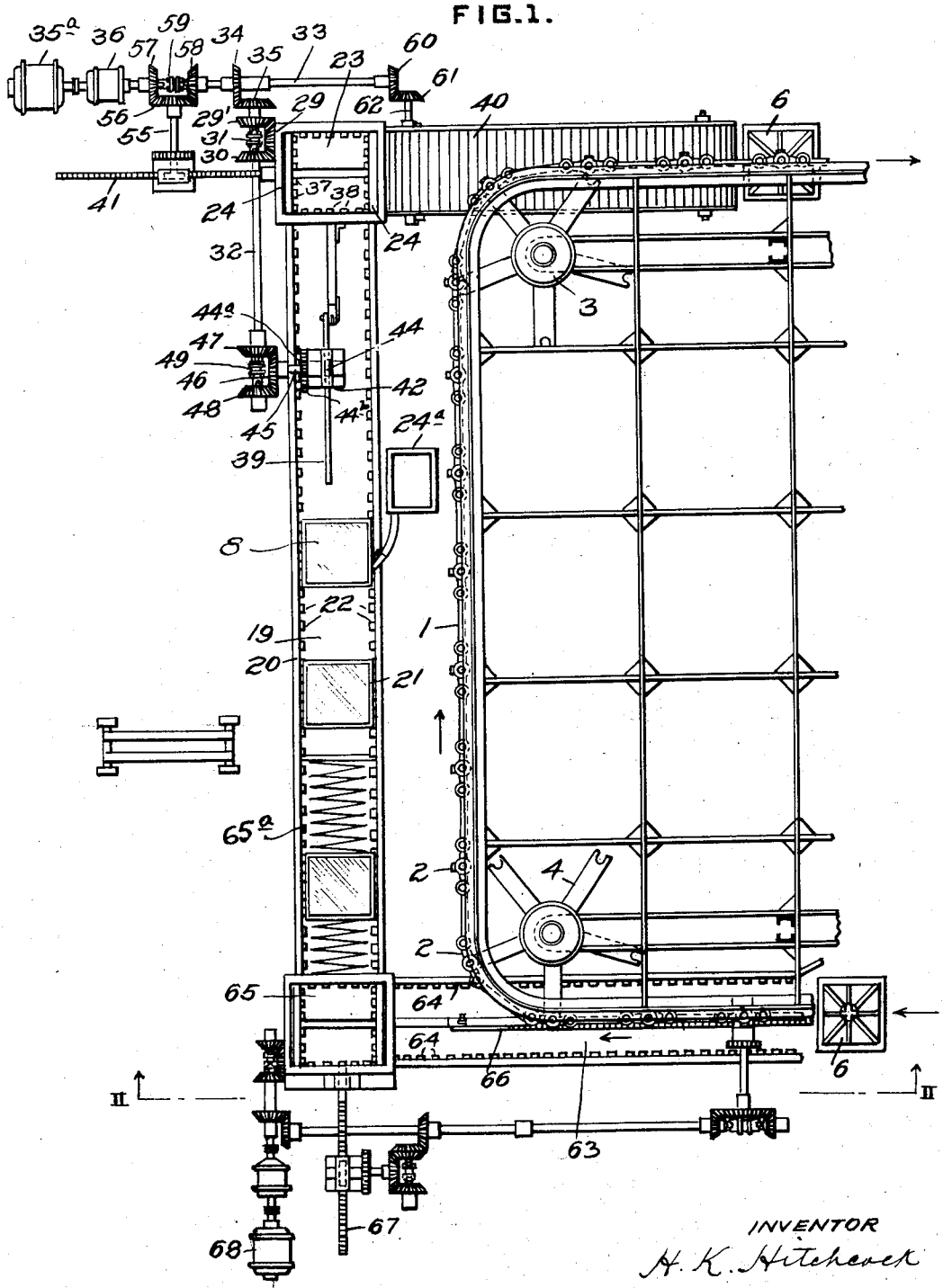

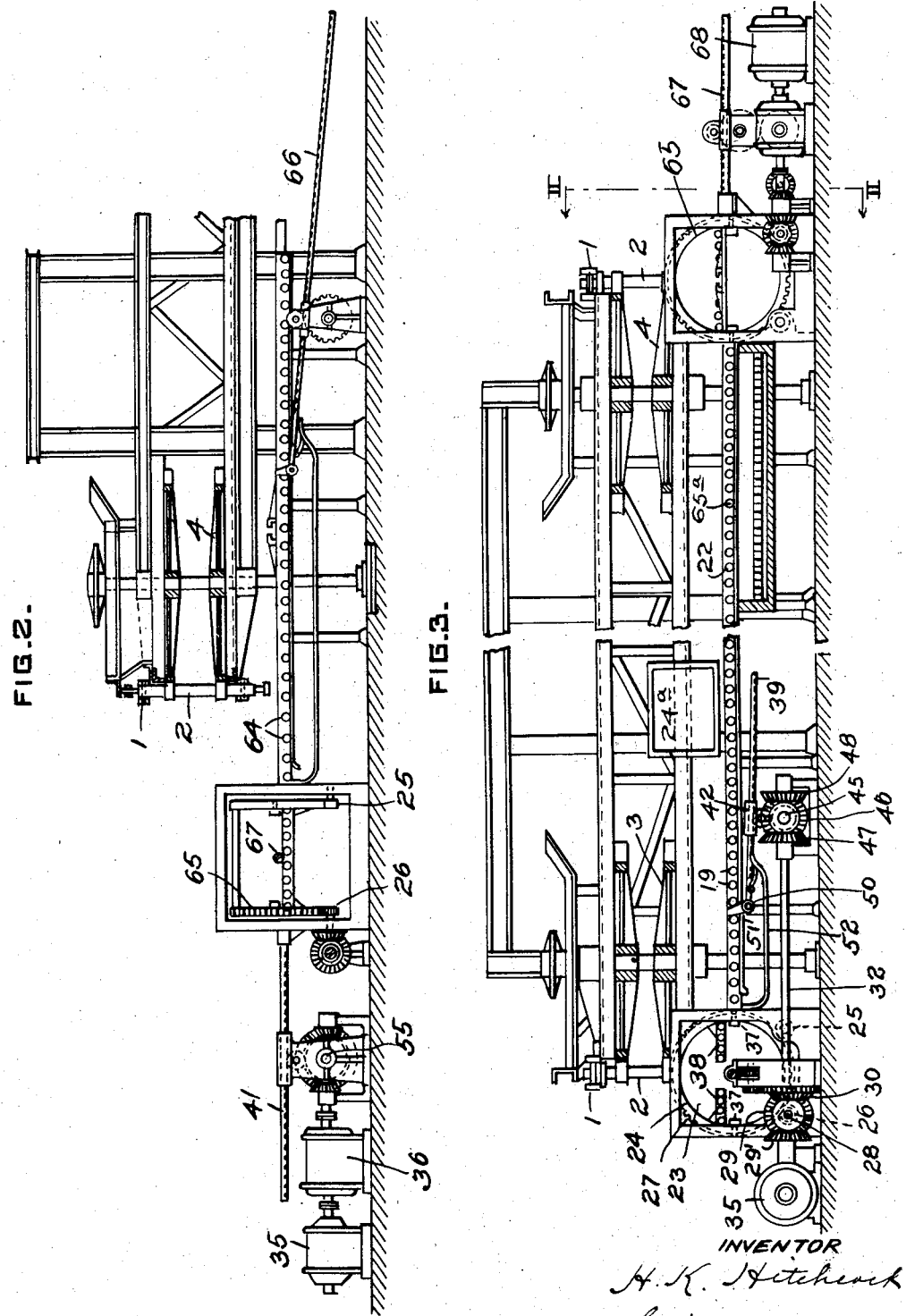

Aug. 4, 1925.

H. K. HITCHCOCK 1,548,140

APPARATUS FOR HANDLING GLASS PLATES

Filed Dec. 12, 1922

6 Sheets-Sheet 3

INVENTOR
H. K. Hitchcock
by
James C. Bradley
atty

Aug. 4, 1925.
H. K. HITCHCOCK
APPARATUS FOR HANDLING GLASS PLATES
Filed Dec. 12, 1922
1,548,140
6 Sheets-Sheet 4
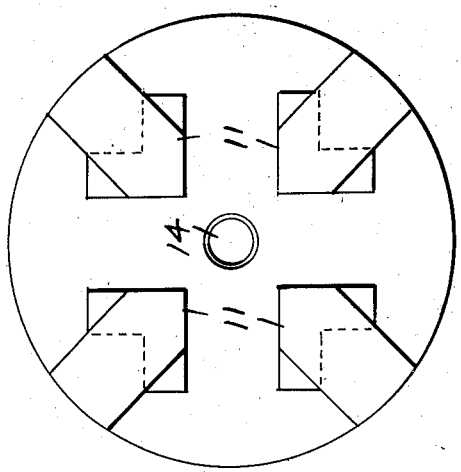
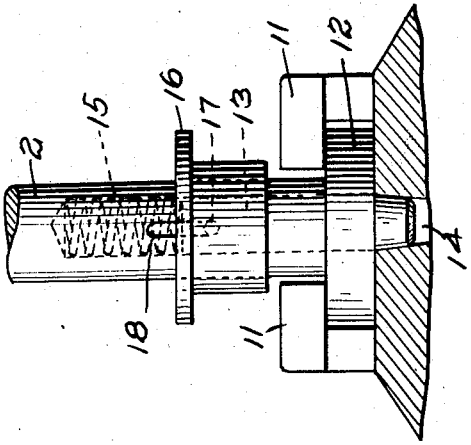
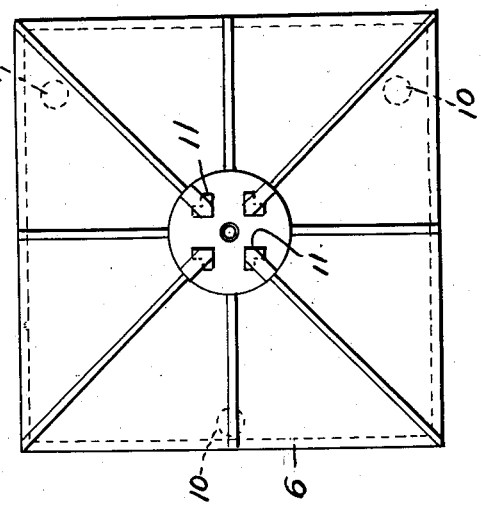
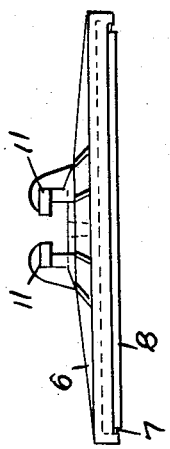
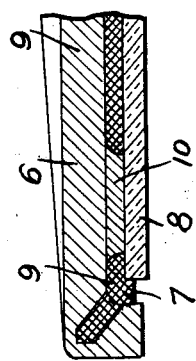
INVENTOR
H. K. Hitchcock
by
James C. Bradley
Atty.

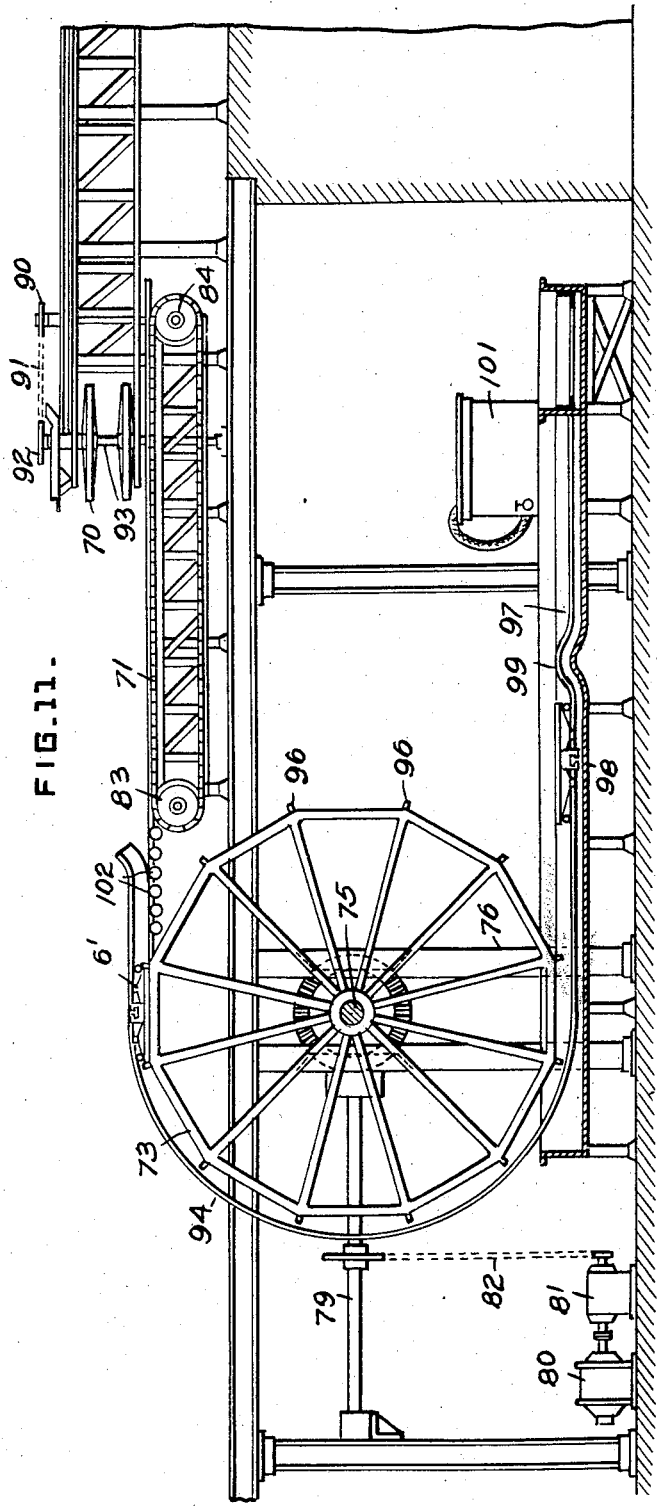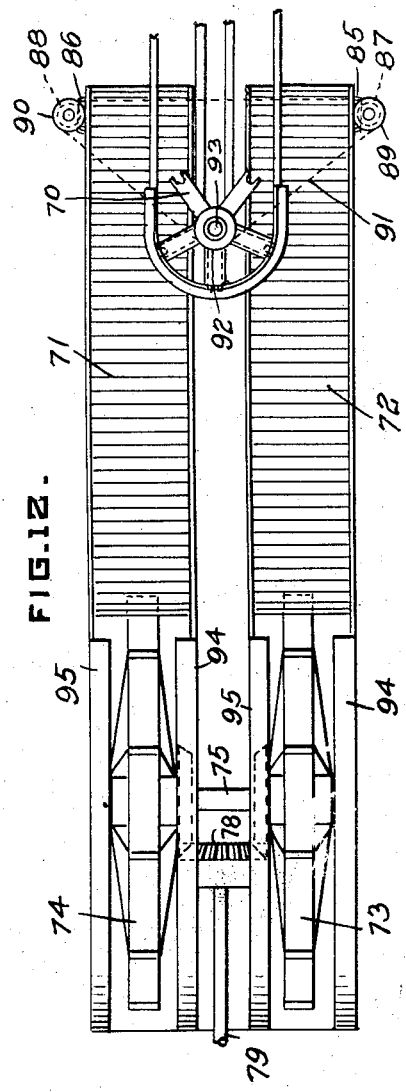

Aug. 4, 1925.  
H. K. HITCHCOCK  
APPARATUS FOR HANDLING GLASS PLATES  
Filed Dec. 12, 1922 6 Sheets-Sheet 6
1,548,140
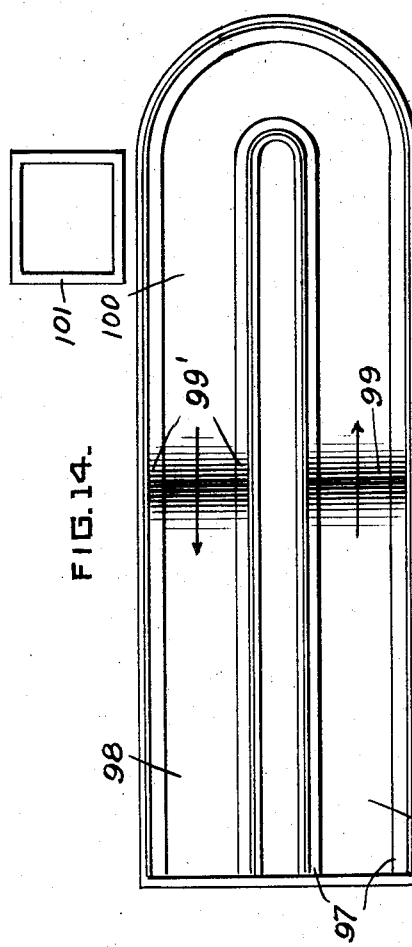
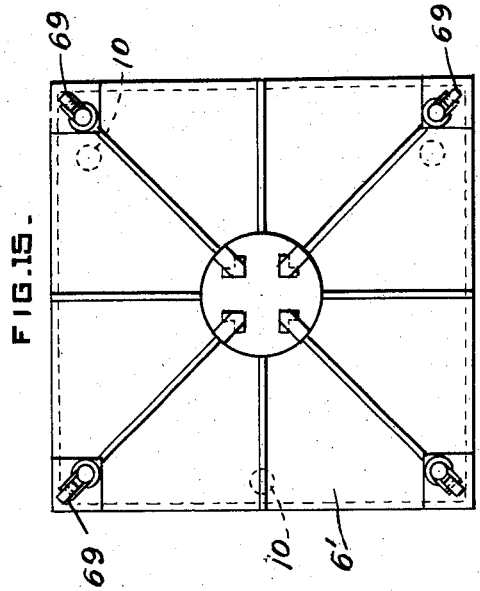
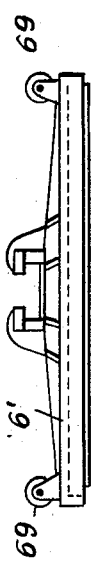
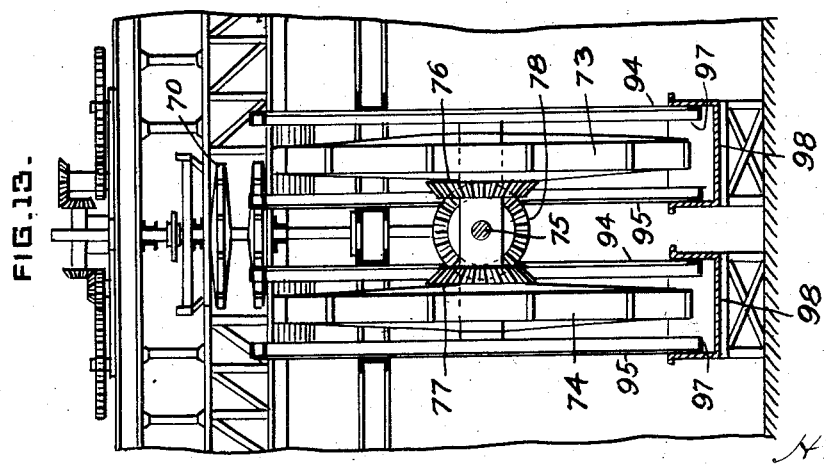
INVENTOR  
H. K. Hitchcock  
by  
James C. Bradley  
attys.

Patented Aug. 4, 1925.

1,548,140

UNITED STATES PATENT OFFICE.

HALBERT K. HITCHCOCK, OF PITTSBURGH, PENNSYLVANIA, ASSIGNOR TO PITTSBURGH PLATE GLASS COMPANY, A CORPORATION OF PENNSYLVANIA.

APPARATUS FOR HANDLING GLASS PLATES.

Application filed December 12, 1922. Serial No. 606,387.

*To all whom it may concern:*

Be it known that I, HALBERT K. HITCHCOCK, a citizen of the United States, and a resident of Pittsburgh, in the county of Allegheny and State of Pennsylvania, have made a new and useful invention in Improvements in Apparatus for Handling Glass Plates, of which the following is a specification.

The invention relates to apparatus for carrying and handling glass plates, and is designed particularly for use in connection with glass surfacing apparatus of the type shown in my application, Serial No. 565,053, filed June 1, 1922, although not limited to use in such connection. In such apparatus the glass plates to be surfaced are supported from above with the faces to be surfaced down, and the plates are then carried, first over a series of grinding tables upon which the downwardly directed faces of the sheets are grounded and smoothed, and then over a series of polishing tables by means of which a polish is imparted to the smoothed surface. This cycle brings the plates back to starting position, where they are reversed to bring the unsurfaced side down and the operation is repeated. In the apparatus of said application, the means employed for carrying the glass sheets with their faces down comprise spindles provided with suction devices which engage the top surfaces of the sheets, automatic devices being employed for engaging the suction devices with the plates and releasing them therefrom.

The present invention contemplates a different method of supporting the glass plates from above in place of the suction devices. In the present instance the plates may be supported on the carrier plates by means of plaster of Paris or other similar material, but preferably by means of paraffine, wax or adhesive material which may be readily softened by the application of heat, thus facilitating the attachment and detachment of the glass plates. The spindles which carry the plates over the grinding and polishing tables are supported on an endless chain carrier as in my pending application, and carry the plates over a series of grinders and polishers (not shown in this application) and back to the starting points where the glass plates are detached from the supporting plates, reversed and re-attached and sent through the same cycle again to surface the other sides.

Figure 5:
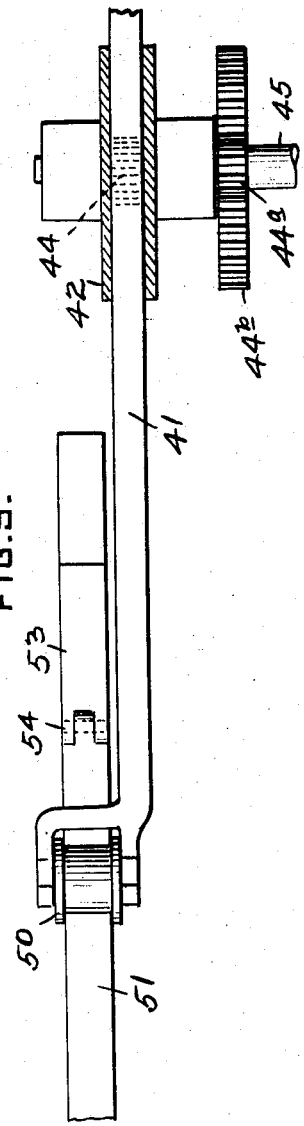

Certain embodiments of the invention are illustrated in the accompanying drawings, wherein:

Figure 1 is a plan view of the apparatus; Fig. 2 is a section on the line II—II of Figs. 1 and 3 looking in the direction of the arrows; Fig. 3 is an end elevation; Fig. 4 is an enlarged side elevation of a detail of construction; Fig. 5 is a plan view of a portion of the device of Fig. 4; Figs. 6, 7 and 8 are detail views on an enlarged scale of the carrier plate, Fig. 6 being a plan view and Fig. 8 being a side elevation; Figs. 9 and 10 are detail views of the coupling device between the carrier plate and the spindle, and Fig. 9 being a plan view of the central portion of the plate and Fig. 10 being a partial sectional view through the plate at the center with the spindle in engaging position therewith; Fig. 11 is a side view of a modification; Fig. 12 is a plan view of such modification; Fig. 13 is an end elevation of a portion of the Fig. 11 construction; Fig. 14 is a plan view of one portion of the Fig. 11 construction; and Figs. 15 and 16 are plan and side elevation views respectively of the carrier plate employed in the construction of Fig. 11.

Referring first to the handling apparatus as shown in Figs. 1, 2 and 3, the numeral 1 designates the carrier in the form of an endless chain which carries the plates to be ground and polished past the series of grinders and polishers, such as those shown in my application heretofore referred to. This carrier consists of links pivoted at their ends to vertical spindles 2 which spindles support at their lower ends the carrier plates upon the lower sides of which the glass plates to be ground are secured. In Fig. 1, in which the left-hand end of the carrier is shown, it will be understood that this carrier is in form an endless chain moving in the direction indicated by the arrows and passing around the sprocket members 3 and 4, the notched ends of the arms of such members receiving the spindles 2. The rest of the carrier system, which is not shown, includes a number of other sprockets corresponding to the sprockets 4 and 5 arranged at suitable points with relation to the grinding and polishing mechanisms, as set forth in my pending application.

One of the carrier plates upon which the glass is supported is illustrated in Figs. 6 to 10, such plate comprising a cast iron frame 6 having a recess 7 in its lower face for carrying the glass sheet. The glass sheet 8 is secured in position by a body of material 9, which may roughly be termed cement, although such material may comprise a wide range of substances such as plaster paris, pitch, paraffine, sulphur and wax of various kinds, the material which is preferably employed being paraffine. This material is advantageous because of its cheapness and because of the readiness with which it may be softened and hardened, the melting point of paraffine being relatively low. In order to level the glass in the recess 7, the lugs or projections 10 of wood or other suitable material are preferably employed, such lugs being the same thickness so that when the glass is positioned and pressed tightly against them, it will lie in a plane parallel to the bottom of the recess 7. At the center of the upper side of the plate is a set of four under-cut lugs 11 for the attachment of the spindle 2, the method of attachment being clear by reference to Figs. 9 and 10. The spindle has its lower end formed into a flange 12 which will slip into position beneath the lugs 11. The spindle also carries a pin 13 slidably mounted therein and adapted to engage a perforation 14 provided at the center of the carrier plate. This pin is normally pressed downward to engage the recess 14 by means of a spring 15 mounted above the end of the pin. The pin may be lifted by means of a collar 16 which is engaged by a pin 17 extending transversely through the collar and through the pin. Upward movement of the pin 17 is permitted by the provision of slots 18 in the sides of the spindle. In the use of the device as hereinafter described provision may be made for the automatic upward movement of the collar 16 and the pin 14 attached thereto when the spindles with the carrier plates have completed the cycle of movement past the grinders and polishers and it becomes necessary to detach the carrier plate and turn it upside down in order to invert or remove the glass.

In order to apply the glass to the carrier plates before attaching such plates to the spindles on the carrier chain 1, such plates are positioned on the runway 19, upside down, as indicated in Fig. 1. This runway comprises a pair of side members 20 and 21 provided with the short rollers 22, so that when the carrier plates are positioned on the runway they may be very easily moved longitudinally thereof to the reversing drum 23 in which the plates must be turned with their faces directed downwardly before attachment to the spindles. In order to cement the glass plates to the carrier plates 6 in those cases in which the cement is of a character which is softened by heating such as paraffine or sulphur, the inverted plate is first brought adjacent a supply tank 24ª carrying the melted paraffine or other cement and a quantity sufficient for the purpose is supplied to the cavity 7 in the face of the plate. The plate is then pressed down against the lugs 10 to level it up as heretofore set forth. The carrier plate is then moved along the runway to a point adjacent the reversing drum 23.

The drum is of skeleton form made up of the angles 24 bent into circular form and connected by suitable transverse members. The ends of the drum are supported upon the rollers 25 (Fig. 3) and is rotated by means of a pinion (not shown but similar to the pinion 26 of Fig. 2) engaging a circular rack 27 carried by the angle iron 24. The pinion is mounted upon a stub shaft 28 which carries at its other end the bevel gear 29 (Fig. 1) driven from one or the other of the bevel gears 29′ and 30 depending upon the position of the clutch 31. The shaft 32 to which the clutch is splined is driven from the shaft 33 through the intermediary of the bevel gears 34 and 35, the shaft 33 being itself driven from the motor 35 which is connected to the shaft through the reducing gearing in the casing 36. The drum is divided into 2 parts to provide a receiving slot for the carrier plates and along one side of this slot are arranged rollers 37 forming a runway in alignment with the rollers 22 of the runway 19. Above this set of rollers is another set of rollers 38 also forming a runway and adapted to support the carrier plate when the drum is turned through 180°.

The carrier plate is preferably stowed into the drum from a position adjacent thereto by means of the stowing bar 39. After the drum has been rotated to turn the carrier plate upside down, such plate is moved transversely through the drum and onto the conveyor 40 by means of the stowing bar 41. The stowing bar 39 is guided through a sleeve 42 (Figs. 4 and 5) and has on its lower side a rack 43 engaged by a pinion 44 (Fig. 3). This pinion is mounted upon a shaft which carries at its outer end a pinion 44ª in engagement with a spur gear 44ᵇ carried by the shaft 45. The shaft 45 (Figs. 1 and 3) is driven from the bevel gear 46 in engagement with the bevel gears 47 and 48 loose upon the shaft 32. A clutch 49 splined to the shaft 32 serves to drive either one or the other of the bevel gears 47 and 48 depending upon whether it is desired to move the stowing tool in or out. The stowing bar is provided at its forward end with a roller 50 adapted to ride upon the guide members 51 and 52, the roller being in engagement with the member 51 as it goes forward and dropping down onto the member 52 when it reaches its forward extreme of movement, so that during the rearward movement of the stowing arm, its forward end is below the level of the rollers 22, thus avoiding interference with the next plate which is being brought along the runway to a position adjacent the drum 23. A swinging section 53 pivoted at 54 serves to support the roller 22 as it moves forward, and on the reverse movement of the roller along the track 52, the roller can lift the section 53 and reach its starting position, at which time the section 53 drops down again to the position illustrated.

The stowing arm 41 is operated from the shaft 55 in a manner similar to that described with respect to the bar 39, except that in the case of this bar, there is no requirement for oscillating the bar in a vertical direction. This bar is provided with a rack which is guided in a sleeve similar to the sleeve 42 and is reciprocated by means of a pinion driven from the shaft 55. The bevel gear 56 on the shaft 55 is driven from one or the other of the gears 57 and 58 adapted to be engaged by the clutch 59 on the shaft 33.

The conveyor 40 is designed to receive the carrier plates after they have been shoved through the drum by means of the bar 41. This conveyor is driven from a shaft 33 by means of the bevel gears 60 and 61 and the shaft 62 which is provided with sprockets around which the chains of the conveyors 40 pass. The conveyor serves to move the carrier plates into position beneath the conveyor 1 where the spindles 2 are brought into interlocking engagement with the carrier plates as heretofore explained in connection with Figs. 9 and 10.

After the carrier plates have been transported by the carrier 1 past the various grinders and polishers and the surfacing operation is completed, they arrive in position over the runway 63 which consists of parallel rails provided with the rollers 64. Here the plates are released from the spindles 2 by raising the collars 16 (Fig. 10), thus moving the holding pins upward so that the carrier plates are free to be moved out of engagement with the collars 12 at the lower ends of the spindles. This disengagement of the carrier plates from the spindles may be accomplished by a manual operation, or by a cam placed in the line of movement of the spindles and adapted to press the collars 16 upward when the plates arrive in proper position over the runway 63. It now becomes desirable to again reverse the carrier plate so as to bring the glass upward in order that it may be readily removed from the plate and released thereon in order to bring the rough side of the glass upward preparatory to the surfacing of such rough surface in a cycle constituting a repetition of the one just described. In order to accomplish this result, the carrier plate is moved into the reversing drum 65 by means of the arm 66 after which the drum is revolved 180° and the stowing bar 67 is operated to move the carrier plate, now in reverse position onto the runway 19.

The operation of the stowing bars 66 and 67 of the drum 65 is accomplished from the motor 68 by means of mechanism which constitutes a duplication of that heretofore described in connection with the stowing bars 39 and 41 and the reversing drum 23, the construction of the parts being the same throughout. The carrier plates as they emerge from the drum 65 lie over an electric heating grid 65$^a$ or other suitable heating means where the carrier plates and cementing materials, such as the paraffine or sulphur are brought to a temperature such that the glass sheets may be released and turned over. The plates are then moved along the runway permitting the holding material to harden, after which the cycle of handling operations heretofore described are repeated in order to accomplish the surfacing of the remaining side of the glass sheet.

Figs. 11 to 15 illustrate a modification of the apparatus of Fig. 1 wherein the turnover or reversing drums are dispensed with and the reversing of the plates is accomplished by means of a pair of wheels which accomplish the turning function by supporting the carrier plates upon their peripheries and carrying them through 180° with a transfer from one wheel to the other during which period the laying of the glass occurs. While this device is somewhat simpler than the other construction, it has the disadvantage of operating at two different levels. The carrier plates employed are similar to those of the first construction except that in the present modification casters 69 are provided at the corners of the plates, such casters being swiveled so that the carrier plates can be wheeled upon these casters in any direction. This expedient does away with the runways provided with rollers such as are employed in the construction of Fig. 1.

Referring to the drawings, 70 is a sprocket wheel corresponding to the sprocket wheels 3 and 4 of Fig. 1 around which passes the carrier chain 7 of Fig. 1 supporting the series of spindles 2. This carrier with the spindles serves to move the carrier plates with the glass plates thereon through the grinding and polishing cycle heretofore described in connection with the construction of Fig. 1, the carrier plates being applied to the spindles of the carrier chain from the conveyor 71, and, after the cycle, being returned to the conveyor 72.

The apparatus constituting the invention of the present modification is located intermediate these conveyors, and such apparatus includes the turnover wheels 73 and 74 and the U shaped runway of Fig. 14. The conveyor 72 serves to receive the carrier plates after the polishing operation and transfer them to the wheel 73 while the conveyor 71 receives the plates from the wheel 74 and carries them to a position where they may be attached to the spindles of the carrier 7. The wheels 73 and 74 are mounted on an axle 75 and carried by a suitable framework 76 and are driven in opposite directions by means of the bevel gears 76 and 77 (Fig. 13). The gears 76 and 77 are driven from the bevel gear 78 mounted upon the shaft 79 and driven from the motor 80 (Fig. 11) through the intermediary of the gearing in the casing 81 and the sprocket chain 82.

The conveyors 71 and 72 consist of endless belts made up of sprocket chains with transverse sections therebetween passing around the sprocket wheels 83 and 84 (Fig. 11). The shafts of the sprockets 84 are provided at their ends with bevel gears 85 and 86 (Fig. 12) driven by other bevel gears 87 and 88 mounted upon vertical shafts carrying at their upper ends the sprocket wheels 89 and 90. These sprocket wheels are driven from the chain 91 passing around the sprocket wheel 92 on the upper end of the shaft 93 which carries the sprocket wheel 70.

Partially encircling the wheels 73 and 74 are guard tracks made up of the pairs of angles 94 and 95. The inwardly extending flanges of these angles are adapted to engage the edges of the carrier plates 6' so that the carrier plates are held against the wheels during their travel around such wheels. In order to prevent any movement of the carrier plates in other directions, the wheels are provided with the upstanding projections 96 (Fig. 11) spaced apart so as to receive the carrier plates between them.

Immediately below the two wheels is the transfer track shown in Fig. 14, such transfer track being of U shape and made up of the angle irons 97 spaced apart far enough to receive the carrier plates between them. The flanges of these angles are engaged by the casters 69 of the carrier plates so that when the plates are deposited upon the track they may be easily moved from one end to the other. A bottom 98 (Fig. 13) is preferably provided between the two angles 97 constituting the track in order to provide a container for liquids, the receiving end of the track into which the wheel 73 discharges being provided with a liquid which is heated by any suitable means, while the other end of the container in which the wheel 74 works is provided with a cooling fluid. In order to separate the two fluids, the track and the bottom 98 are brought to a higher level adjacent the curved portion of the track as indicated at 99 (Fig. 11). When the plates arrive at this point on the track in passing from the wheel 73 to the wheel 74, they are moved up out of the heated liquid. When they arrive at a point opposite on the other leg of the track, they pass over another raised portion 99' (Fig. 14), bringing the plates into the cooling liquid.

In starting the cycle of operations, the plates are placed upon the portion of the track marked 100 (Fig. 14) with their recessed portions up and their casters in engagement with the angle track 97. Opposite this portion of the track is a container 101 carrying a supply of the heated liquid, which is to serve to secure the plates in position, such as sulphur or paraffine. At this point, a quantity of the heated liquid is run into the recess in the carrier plate and a sheet of glass is pressed down into the heated liquid until it engages the leveling blocks or lugs 10 in the bottom of the recess. The plate is then moved along the track into the cooling fluid at the end thereof which carries the lower periphery of the wheel 74. The rotation of the wheel engages the front and rear sides of the plate between the projections 96, and the plate is moved along the guard track 95 and discharged upon the roller runway 102 which discharges the plate to the conveyor 71. The conveyor 71 carries the plate to the right where it is engaged by one of the spindles on the carrier chains. After the plate has been transported by the carrier chain past the various grinders and polishers, it is deposited upon the right hand end of the conveyor 72 (Fig. 12) and carried to the wheel 73, a roller runway similar to the runway bridging the space between the wheel and the conveyor. The plate passes between a pair of the projections 96 and is carried by the rotating wheel around 180° and deposited in the container between the ends of the track angles 97. Here the plate is heated by the liquid in the container sufficiently to soften the paraffine, and when the carrier plate rides up upon the track at the point 99, the sheet of glass may be removed and turned upside down in the softened paraffine, thus bringing the rough side of the plate up. The carrier plate is then moved around the curve of the track into the cooling section of the container and engaged by the wheel 74, the cycle as heretofore described then being repeated.

The term cement, as used in connection with the holding material in the carrier plates, is intended in its broad sense to include even a material which has very little adhesive property, such as paraffine, the holding effect in such case depending primarily on the fact that little or no air is allowed to remain between the paraffine and the glass plate, so that atmospheric pressure is effective to hold the glass tightly in position in the carrier plate. The fact that the glass is pressed into the liquid or semi-liquid paraffine serves to eliminate to a very large extent any air which might otherwise lie between the carrier plate and the glass.

What I claim is:

1. Apparatus for carrying a series of glass plates face downward over a series of surfacing tables, comprising an endless chain carrier passing over the series of tables, carrier plates detachably secured to the carrier, and means for cementing the glass plates to the lower faces of said carrier plates.

2. Apparatus for carrying a series of glass plates face downward over surfacing tables, comprising an endless chain carrier passing over the tables, carrier plates, means for detachably securing them to the carrier, means for supporting the carrier plates face upward during the attachment thereto of the glass plates, means for cementing the glass in position on the carrier plates, and means for reversing the plates preliminary to their attachment to the carrier.

3. Apparatus for carrying a series of glass plates face downward over a series of surfacing tables, comprising an endless chain carrier passing over the series of tables, and carrier plates detachably secured to the carrier and provided on their lower sides with cementing material subject to softening action by heat for attaching the glass plates thereto.

4. Apparatus for carrying a series of glass plates face downward over surfacing tables, comprising an endless carrier provided with depending spindles passing over the tables, and carrier plates detachably secured to the spindles at their lower ends and provided on their lower sides with recesses carrying bodies of cementing material subject to softening action on the application of heat thereto for securing the glass plates releasably thereto.

5. Apparatus for carrying a series of glass plates face downward over surfacing tables, comprising an endless carrier passing over the tables, carrier plates, to the lower faces of which the glass sheets to be surfaced are cemented, means for attaching the plates to the carrier, and means for turning the carrier plates upside down after the surfacing operation.

6. Apparatus for carrying a series of glass plates face downward over surfacing tables, comprising an endless carrier passing over the tables, carrier plates, to the lower faces of which the glass sheets to be surfaced are cemented, means for attaching the carrier plates to the carrier, means for turning the carrier plates upside down after the surfacing operation and means for applying heat to soften the cement after the carrier plates are so reversed in position.

7. Apparatus for carrying a series of glass plates face downward over surfacing tables, comprising an endless carrier passing over the tables, carrier plates, to the lower faces of which the glass sheets to be surfaced are cemented, means for supporting such carrier plates face upward during the cementing operation, means for inverting the carrier plates with the glass plates thereon preliminary to the surfacing operation, means for attaching the carrier plates to the carrier, and means for again inverting the carrier plates to bring them to position with the glass plates upward after the surfacing operation.

8. Apparatus for carrying a series of glass plates face downward over surfacing tables, comprising an endless carrier passing over the tables, carrier plates, to the lower faces of which the glass sheets to be surfaced are cemented, means for supporting such carrier plates face upward during the cementing operation, means for inverting the carrier plates with the glass plates thereon preliminary to the surfacing operation, means for attaching the carrier plate to the carrier, means for again inverting the carrier plates after the surfacing operation, and means for heating the plates to soften the cement.

9. A device for supporting a sheet of glass face downward over a horizontal surfacing table comprising a carrier member provided with a recess in its lower face adapted to receive the glass with its surface lying below the face of the carrier member, and a holding material for the glass in the recess adapted to be softened by the application of heat thereto.

10. A device for supporting a sheet of glass face downward over a horizontal surfacing table comprising a spindle, a carrier plate having releasable engagement with the lower end of the spindle and provided with a recess in its lower face adapted to receive the glass with its surface lying below the face of the plate, a holding material for the glass in the recess adapted to be softened by the application of heat thereto, and a vertical spindle releasably secured to said plate.

11. Apparatus for carrying a series of glass plates face downward over surfacing tables, comprising an endless carrier passing over the tables, carrier plates detachably secured to the carrier, means for cementing the glass plates to the lower faces of the carrier plates, and turnover devices for the carrier plates in position to reverse the plates preliminary to their attachment to the carrier and after they have been detached therefrom.

12. Apparatus for carrying a series of glass plates face downward over surfacing tables, comprising an endless carrier passing over the tables, carrier plates detachably secured to the carrier, means for cementing the glass plates to the lower faces of the carrier plates, turnover devices for the carrier plates in position to reverse the carrier plates preliminary to their attachment to the carrier and after they have been detached therefrom and means for heating the plates when in inverted position to soften the cement.

13. Apparatus for carrying a series of glass plates face downward over surfacing tables, comprising an endless carrier passing over the tables, carrier plates detachably secured to the carrier turnover devices for the carrier plates in position to reverse the carrier plates preliminary to their attachment to the carrier and after they have been detached therefrom, a runway between the turnover devices on which the carrier plates are adapted to move, and heating means positioned adjacent the runway for softening the cement on the carrier plates.

In testimony whereof, I have hereunto subscribed my name this 14th day of Nov., 1922.

HALBERT K. HITCHCOCK.